United States Patent
Gamishev et al.

(10) Patent No.: US 11,425,117 B2
(45) Date of Patent: Aug. 23, 2022

(54) METHOD FOR OBTAINING A PROFILE FOR ACCESS TO A COMMUNICATION NETWORK BY A SECONDARY TERMINAL VIA A MAIN TERMINAL

(71) Applicant: ORANGE, Issy-les-Moulineaux (FR)

(72) Inventors: Todor Gamishev, Chatillon (FR); Said Gharout, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 138 days.

(21) Appl. No.: 16/636,185

(22) PCT Filed: Jul. 26, 2018

(86) PCT No.: PCT/FR2018/051925
§ 371 (c)(1),
(2) Date: Feb. 3, 2020

(87) PCT Pub. No.: WO2019/025704
PCT Pub. Date: Feb. 7, 2019

(65) Prior Publication Data
US 2020/0267141 A1    Aug. 20, 2020

(30) Foreign Application Priority Data
Aug. 3, 2017 (FR) .................................... 1757502

(51) Int. Cl.
*H04L 9/40* (2022.01)
*H04W 12/06* (2021.01)

(52) U.S. Cl.
CPC ......... *H04L 63/0853* (2013.01); *H04W 12/06* (2013.01)

(58) Field of Classification Search
CPC ........................... H04L 63/0853; H04W 12/06
(Continued)

(56) References Cited

U.S. PATENT DOCUMENTS

| 2011/0167270 A1* | 7/2011 | Lee ................. H04L 9/3271 713/170 |
| 2014/0086177 A1* | 3/2014 | Adjakple ........... H04L 67/10 370/329 |

(Continued)

FOREIGN PATENT DOCUMENTS

EP    2741459 A1    6/2014

OTHER PUBLICATIONS

English translation of the Written Opinion of the International Searching Authority dated Oct. 31, 2019 for corresponding International Application No. PCT/FR2018/051925, filed Jul. 26, 2018.
(Continued)

*Primary Examiner* — Anthony D Brown
(74) *Attorney, Agent, or Firm* — David D. Brush; Westman, Champlin & Koehler, P.A.

(57) ABSTRACT

A method for obtaining a profile for access to a communication network by a secondary terminal via a main terminal. The main terminal includes a security element having an authentication key, the authentication key being used by the network and by the main terminal to generate at least one session master key specific to the main terminal. The secondary terminal: provides its identifier to the main terminal; receives from the main terminal a temporary key specific to the secondary terminal, a temporary identifier of the secondary terminal, and an identifier of the network for access to the network. The temporary key is based on the temporary identifier of the secondary terminal and the session master key of the main terminal. The temporary key, the temporary identifier, the identifier of the secondary terminal, and the identifier of the access network are included in an profile for access to the network.

14 Claims, 2 Drawing Sheets

(58) Field of Classification Search
USPC .......................................................... 726/7
See application file for complete search history.

(56) References Cited

U.S. PATENT DOCUMENTS

2016/0021635 A1  1/2016  Lee et al.
2016/0242032 A1  8/2016  De Kievit

OTHER PUBLICATIONS

International Search Report dated Oct. 12, 2019 for corresponding International Application No. PCT/FR2018/051925, filed Jul. 26, 2018.
Written Opinion of the International Searching Authority dated Oct. 12, 2019 for corresponding International Application No. PCT/FR2018/051925, filed Jul. 26, 2018.

* cited by examiner

METHOD FOR OBTAINING A PROFILE FOR ACCESS TO A COMMUNICATION NETWORK BY A SECONDARY TERMINAL VIA A MAIN TERMINAL

CROSS-REFERENCE TO RELATED APPLICATIONS

This Application is a Section 371 National Stage Application of International Application No. PCT/FR2018/051925, filed Jul. 26, 2018, the content of which is incorporated herein by reference in its entirety, and published as WO 2019/025704 on Feb. 7, 2019, not in English.

FIELD OF THE DISCLOSURE

The present invention relates to the field of access to a mobile communication network. More precisely it pertains to the obtaining of a profile for access to a network by a first mobile terminal, so-called secondary terminal, by means of a second terminal, so-called main terminal, which is equipped with a security module.

BACKGROUND OF THE DISCLOSURE

To access a mobile network, for example a mobile network of "EPS" (for "Evolved Packet System") type, a mobile terminal must authenticate itself with a connectivity provider by means of secrets shared between the security module included in the mobile terminal, and an authentication center of the connectivity provider. Once authentication has been carried out successfully, the terminal and the network share the knowledge of a hierarchy of keys which is generated on the one hand by the terminal and the security module and on the other hand by the network and which allows access and exchange of secure data between the mobile terminal and the network.

The notion of access to the mobile network in a temporary manner and/or on the basis of a mobile equipment which does not possess any security module does not exist, so as to prevent frauds based for example on the cloning of the authentication data (one speaks of "credentials" in English) included in the security module of the mobile terminal and necessary for access to the network.

It is however possible for a terminal which is not equipped with a security module or/and with appropriate authentication data, to access the mobile network by means of a mobile terminal equipped with a security module. The mobile terminal is used in this case as a modem; it provides Internet connection to the terminal. The terminal connects to the mobile terminal by means of a cable, for example a USB cable, or by means of wireless communication such as by Bluetooth or by WiFi. Such sharing of Internet connection with a mobile equipment equipped with a security module and used as modem is customarily called "tethering" in English.

Nevertheless, access to the network by the terminal which does not have a security element and/or appropriate authentication data is constraining. For example, access to the network obliges this terminal to remain in proximity to the mobile terminal equipped with a security module and which is used as modem to provide the Internet connection. Such access also requires that the mobile terminal which is used as modem is charged throughout the session for access to the network by the terminal which uses it to access the network.

SUMMARY

One of the aims of the invention is to remedy inadequacies/drawbacks of the prior art and/or to afford improvements thereto.

To this end, the invention proposes a method for obtaining a profile for access to a communication network by a secondary terminal via a main terminal, the main terminal comprising a security element comprising an authentication key, said authentication key being used by the network and by the main terminal to generate at least one session master key specific to the main terminal, the method, implemented by the secondary terminal, comprising:
provision to the main terminal of an identifier of the secondary terminal,
reception from the main terminal, of a temporary key and of a temporary identifier of the secondary terminal, and of an identifier of the network for access to the network, said temporary key being generated on the basis of the temporary identifier of the secondary terminal generated by the network and of the session master key of the main terminal, the temporary key, the temporary identifier and the identifier of the secondary terminal, and the identifier of the access network being included in a profile for access to the network of the secondary terminal.

With the method for obtaining a profile for access to the network such as described here, a secondary terminal possessing radio capabilities but not initially having any datum to access the network generates a profile for access to the network which is shared with the network and which allows it to access the network.

The profile which is generated by way of the main terminal does not involve any dependency from a connection point of view between the secondary terminal and the main terminal. Indeed, once the access profile has been generated and shared between the secondary terminal and the network, access of the secondary terminal to the network can take place independently of the main terminal. Thus, there is no necessity, for the secondary terminal, to be in geographical proximity to the main terminal. Neither is there any necessity for the main terminal to be switched on and/or charged, contrary to the constraints induced by tethering.

The generation of the profile for access to the network and also of the security context is controlled by the network. In particular, the generation of the temporary key is implemented in the network. This contributes to the security of the method in the sense that this avoids any risk of cloning of authentication data on the secondary terminal, which does not possesses any.

Moreover, the lifetime of the temporary key and of the keys which depend thereon, such as the secondary session key, is limited to the duration of a current access session. This limits the risks of compromise.

The method makes it possible to generate on either side, that is to say at the level of the secondary terminal and of the network, a profile for access to the network without implementing exchanges of messages comparable to those of an attachment to the network. Indeed, the generation of the profile takes place within the framework of an existing security context, in this instance that which was generated for the existing main terminal. Thus, the generation of the access profile for the secondary terminal does not induce any additional load in the network, which is inherent in exchanges that would take place in the case of a conventional attachment to the network of the secondary terminal.

The temporary key is specific to the secondary terminal.

Moreover the reception of the temporary key, of the temporary identifier of the secondary terminal and of an identifier of the network for access to the network indicates to the secondary terminal its authentication with the access network identified and the authentication of this access network with the secondary terminal.

In an exemplary embodiment, the method for obtaining an access profile comprises generation of a secondary session master key on the basis of the temporary key and of the identifier of the secondary terminal.

This secondary session master key is specific to the secondary terminal.

The secondary session master key is intended to be used to generate a hierarchy of keys for secure access to the network of the secondary terminal. It is included in the security context specific to the secondary terminal and is therefore necessary for access to the network by the secondary terminal.

In an exemplary embodiment, the method for obtaining an access profile comprises generation of a secondary session master key on the basis of the temporary key, of the identifier of the secondary terminal and of the identifier of the network for access to the network.

The invention also relates to a method for aiding the obtaining of a profile for access to a communication network by a secondary terminal via a main terminal, the main terminal comprising a security module comprising an authentication key, said authentication key being used by the network and by the main terminal to generate at least one session master key specific to the main terminal, the method, implemented by the main terminal, comprising:
- obtaining of an identifier of the secondary terminal,
- dispatching to the network of a request for temporary subscription for the secondary terminal, said request comprising the identifier of the secondary terminal,
- reception, from the network, of a temporary identifier of the secondary terminal generated by the network,
- generation of a temporary key specific to the secondary terminal, on the basis of the session master key of the main terminal and of the temporary identifier of the secondary terminal,
- dispatching to the secondary terminal of the temporary key and of the temporary identifier of the secondary terminal, and of an identifier of the network for access to the network.

The method described here corresponds to an implementation at the level of the main terminal.

In an exemplary embodiment, the request for temporary subscription for the secondary terminal comprises a duration of the subscription.

The main terminal can thus specify in the request for temporary subscription for the secondary terminal, the duration of validity of the profile for access to the network intended for the secondary terminal UE2. The control of the duration is then managed at the network level. However, it is the main terminal, whose profile for access to the network and whose security context are used to generate the profile for access to the network of the secondary terminal which keeps this duration in check.

The invention also relates to a method for generating a profile for access to a communication network for a secondary terminal via a main terminal, the main terminal comprising a security module comprising an authentication key, said authentication key being used by the network and by the main terminal to generate at least one session master key specific to the main terminal, the method implemented by the network comprising:
- reception, from the main terminal, of a request for temporary subscription for the secondary terminal, said request comprising an identifier of the secondary terminal,
- generation of a temporary identifier and of a temporary key of the secondary terminal, said temporary key being generated on the basis of the temporary identifier of the secondary terminal and of the session master key of the main terminal, the temporary key, the temporary identifier and the identifier of the secondary terminal, and an identifier of the network for access to the network being included in a profile for access to the network of the secondary terminal,
- dispatching to the main terminal of the temporary identifier of the secondary terminal.

The method for generating an access profile described here corresponds to an implementation at the level of the network. On conclusion of these steps, the network possesses the profile for access to the network of the secondary terminal.

In an exemplary embodiment, the method for generating an access profile comprises generation of a secondary session master key specific to the secondary terminal on the basis of the temporary key and of the identifier of the secondary terminal.

Thus, the network is able to generate the security context specific to the secondary terminal and necessary in order for the latter to access the network in a secure manner.

In an exemplary embodiment, the method for generating an access profile comprises generation of a secondary session master key on the basis of the temporary key, of the identifier of the secondary terminal and of the identifier of the network for access to the network.

The invention also pertains to a secondary terminal designed to obtain a profile for access to a communication network via a main terminal, the main terminal comprising a security element comprising an authentication key, said authentication key being used by the network and by the main terminal to generate at least one session master key specific to the main terminal, the secondary terminal comprising:
- provision means, designed to provide an identifier of the secondary terminal to the main terminal,
- reception means, designed to receive from the main terminal, data comprising a temporary key specific to the secondary terminal, a temporary identifier of the secondary terminal, and an identifier of the network for access to the network, said temporary key being generated on the basis of the temporary identifier of the secondary terminal generated by the network and of the session master key of the main terminal, the temporary key, the temporary identifier, the identifier of the secondary terminal and the identifier of the access network being included in a profile for access to the network of the secondary terminal, the reception of the temporary key, of the temporary identifier of the secondary terminal and of an identifier of the network for access to the network indicates to the secondary terminal its authentication with the access network identified and the authentication of this access network with the secondary terminal.

In an exemplary embodiment, the secondary terminal comprises generating means, designed to generate a secondary session master key specific to the secondary terminal on the basis of the temporary key and of the identifier of the secondary terminal.

The invention also relates to a program for a secondary terminal, comprising program code instructions intended to control the execution of the steps of the method for obtaining a profile for access to a communication network, described above, when the program is executed on said secondary terminal.

The invention also relates to a main terminal designed to aid the obtaining of a profile for access to a communication network by a secondary terminal, the main terminal comprising a security module comprising an authentication key, said authentication key being used by the network and by the main terminal to generate at least one session master key specific to the main terminal, the main terminal comprising:

obtaining means, designed to obtain an identifier of the secondary terminal, first dispatching means, designed to dispatch to the network a request for temporary subscription for the secondary terminal, said request comprising the identifier of the secondary terminal, reception means, designed to receive from the network a temporary identifier of the secondary terminal generated by the network, generating means, designed to generate a temporary key, said temporary key being generated on the basis of the session master key of the main terminal and of the temporary identifier of the secondary terminal, second dispatching means, designed to dispatch to the secondary terminal the temporary key, the temporary identifier and an identifier of the network for access to the network.

The invention also pertains to a program for a main terminal, comprising program code instructions intended to control the execution of the steps of the method for aiding the obtaining of a profile for access to a communication network by a secondary terminal via the user terminal, as claimed in claim 3 or claim 4, when the program is executed on said terminal.

The invention also relates to a device of a communication network, designed to generate a profile for access to a communication network for a secondary terminal via a main terminal, the main terminal comprising a security module comprising an authentication key, said authentication key being used by the network and by the main terminal to generate at least one session master key specific to the main terminal, the device comprising:

reception means, designed to receive, from the main terminal, a request for temporary subscription for the secondary terminal, said request comprising an identifier of the secondary terminal, first generating means, designed to generate a temporary identifier and a temporary key specific to the secondary terminal, said temporary key being generated on the basis of the temporary identifier of the secondary terminal and of the session master key of the main terminal, the temporary key, the temporary identifier, the identifier of the secondary terminal and an identifier of the network for access to the network being included in a profile for access to the network of the secondary terminal, dispatching means, designed to dispatch the temporary identifier of the secondary terminal to the main terminal.

In an exemplary embodiment, the network device comprises second generating means, designed to generate a secondary session master key on the basis of the temporary key and of the identifier of the secondary terminal, the secondary session master key, the temporary identifier of the secondary terminal and an identifier of the network being included in a profile for access to the network of the secondary terminal.

The invention also relates to a program for a device of a communication network, comprising program code instructions intended to control the execution of the steps of a method for generating a profile for access to a communication network for a secondary terminal via a main terminal such as described above, when the program is executed on said device.

The invention also pertains to a system for obtaining a profile for access to a communication network by a secondary terminal via a main terminal comprising:

a network device such as described above, a main terminal such as described above, and at least one secondary terminal such as described above.

BRIEF DESCRIPTION OF THE DRAWINGS

Other features and advantages of the present invention will be better understood from the description and the appended drawings, in which.

DETAILED DESCRIPTION OF ILLUSTRATIVE EMBODIMENTS

Figure 1:
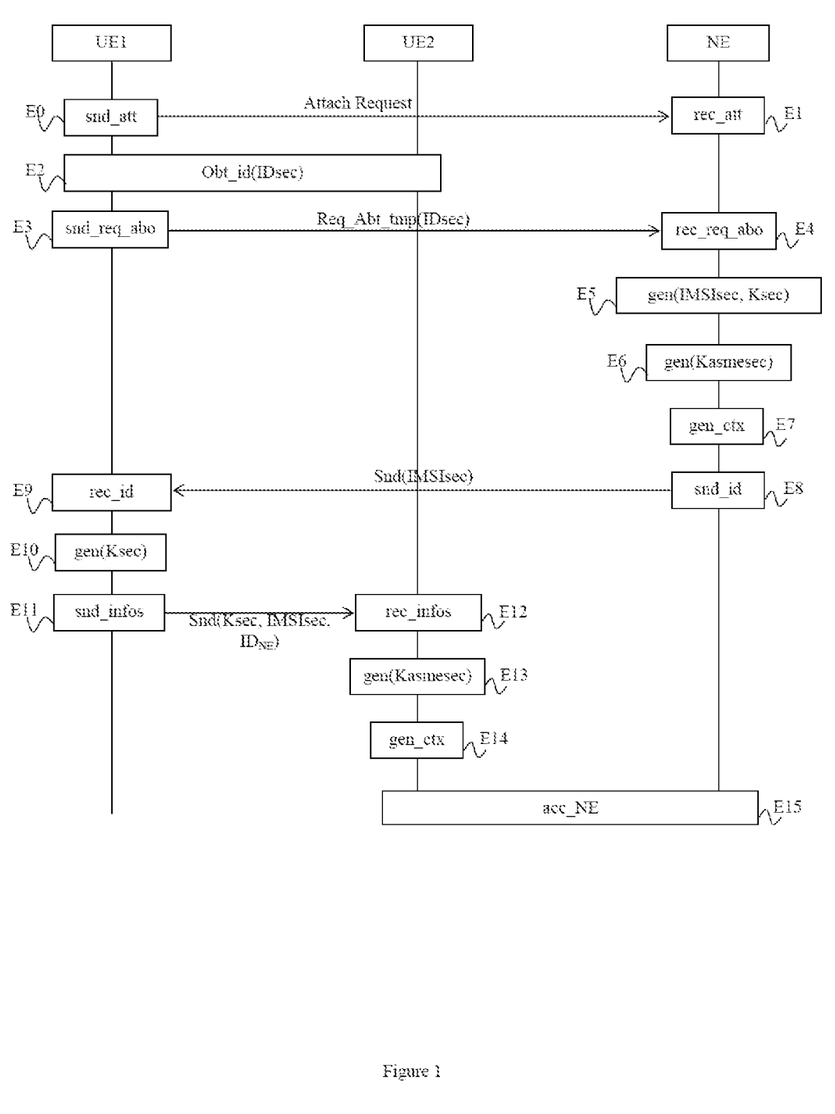
FIG. 1 presents the steps of a method for obtaining a profile for access to a communication network by a secondary terminal via a main terminal, according to an exemplary embodiment.

The steps of a method for obtaining a profile for access to a communication network by a secondary terminal via a main terminal, according to an exemplary embodiment, will now be described in conjunction with FIG. 1.

A first user equipment UE1, hereinafter called "main terminal UE1", is designed to access a mobile communication network, represented in FIG. 1 by a network entity NE. The conventional architecture of such a user equipment customarily distinguishes an execution environment comprising an operating system adapted for the execution of applications of the user, an execution environment responsible for the network communications and called "baseband", and a security element (the term customarily used is the English term "Secure Element"). The security element is of "UICC" (from the English "Universal Integrated Circuit Card"), or "eUICC" (for "embedded") type. An exemplary security module is a "(U)SIM" (for "(Universal) Subscriber Identity Module") card inserted into a mobile equipment and used in mobile telephony. The security element is designed to store and process sensitive data, for example an application for access to the network and associated authentication data (one speaks of "credentials" in English), such as cryptographic keys and algorithms. Such data are intended to be used by an authentication protocol with the network during access to the latter. The invention is not limited to a user equipment of this type and in another exemplary embodiment, the security element of the main terminal UE1 is a secure software area designed to process the sensitive data for access to the network. The main terminal UE1 is a general-public mobile equipment, for example an intelligent terminal of smartphone type, a tablet, etc. The user of the main terminal UE1 possesses a subscription allowing him to access the mobile network of the operator in charge of the network entity NE. To this effect the main terminal UE1 comprises security data which make it possible to generate a profile for access to the network. A profile for access to the network comprises a set of data which make it possible to access the network in a secure manner More precisely, the access profile comprises at least one identifier of the main terminal UE1, an identifier of the network to which it has access by virtue of its subscription, and data, such as an authentication key, customarily denoted K in an EPS (for "Evolved Packet Service") network, which are intended to be used during the phase of authentication with the network.

A second user terminal UE2, hereinafter called "secondary terminal UE2", comprises an application-related execution environment, adapted to execute user applications and an execution environment of "baseband" type, responsible for network communications. However, the secondary terminal UE2 is, initially, not designed to access the mobile network represented by the network entity NE. In a first exemplary embodiment, the secondary terminal UE2 does not possess any security element.

The network entity NE represents the network which the main terminal UE1 accesses by means of its subscription. A single network entity NE is represented in FIG. 1. Of course, this entity carries out functionalities which can be implemented by several devices or/and servers of the network (which are not represented in FIG. 1). For example, in the case of an EPS network, the devices comprise a base station, designed to manage radio transmission and reception with the main terminal UE1, one or more mobility management entities, responsible for control in the network, a subscribers server or authentication server adapted to authenticate the user equipments that it manages, etc.

In a conventional manner, and for network access purposes, the security module of the main terminal UE1 stores an authentication key, customarily denoted K, shared with the network entity NE, more precisely with the network's subscribers server. The authentication key K is intended to be used for the generation of authentication data and to derive keys such as a session master key, customarily denoted Kasme, and radio pathway encryption and integrity control keys.

In an initial step E0 of accessing the network, the main terminal UE1 emits on the radio pathway an attachment request Attach Request which forms part of an attachment phase on conclusion of which the main terminal UE1 is authenticated by the network NE. The attachment request is received by the network entity NE in a reception step E1. This attachment phase comprises a physical attachment to the network, that is to say at the radio pathway level, and then negotiation of parameters with the network. The attachment request comprises an identifier of the main terminal UE1, for example a permanent identifier called "IMSI" (from the English "International Mobile Subscriber Identity"). The IMSI is a unique number, stored in the security element, and which allows the mobile network to identify the client as being a subscriber. With the aim of simplifying FIG. 1, only the request for attachment to the network is represented so as to diagrammatically show the attachment phase, presumed known. On conclusion of the attachment phase, the main terminal UE1 and the network NE are authenticated and share the knowledge of a session master key, denoted Kasme, and intended to be used to derive a hierarchy of keys, which includes an encryption key for the radio pathway and an integrity control key.

In a following step E2 of obtaining an identifier, the main terminal UE1 obtains an identifier IDsec of the secondary terminal UE2. In a first exemplary embodiment, the identifier IDsec of the secondary terminal UE2 is inscribed on the secondary terminal UE2, or on the packaging of the secondary terminal UE2. Of course, the identifier IDsec of the secondary terminal is also stored in the secondary terminal UE2. In this example, the identifier IDsec of the secondary terminal UE2 is a constant datum. In another exemplary embodiment, the secondary terminal UE2 comprises an application for generating tickets. A ticket is an identifier of the secondary terminal UE2, in the form of a string of alphanumeric characters for example, generated for a current session. A single-use identifier, such as a ticket, contributes to the security of the method since it can only be used once. To this effect, it may be imagined that the network entity NE manages a database of tickets used. The ticket is for example provided by the application for generating tickets in the form of a QR code (for "Quick Response Code") which is intended to be scanned by the main terminal UE1 by means of a barcode reader. In this example, the identifier IDsec of the secondary terminal UE2 can vary. In any event, the identifier IDsec of the secondary terminal UE2 is considered to be a private datum which is intended to be provided by the user of the secondary terminal UE2 only within the framework of the obtaining of a profile for access to the network through the main terminal UE1.

In an exemplary embodiment, the main terminal UE1 obtains the identifier IDsec of the secondary terminal UE2 by scanning it, if it is in the form of a QR code or if it is printed on the secondary terminal UE2. In another exemplary embodiment, the user manually inputs the identifier IDsec of the secondary terminal UE2 in an input area of the main terminal UE1. Note that it is not presupposed that a security link is established between the main terminal UE1 and the secondary terminal UE2 for secure transmission of the identifier IDsec of the secondary terminal UE2 to the main terminal UE1. However, as stated above, the identifier IDsec is a private datum which is not intended to be disclosed. Thus, the obtaining of the identifier IDsec of the secondary terminal UE2 by scan or by manual input is favored so as to limit to the maximum any risk of theft of the identifier which in this case travels in the clear. For example, one avoids the use of wireless technologies of NFC type in the case where an attacker were listening to this channel.

In a step E3 of dispatching a request for temporary subscription, the main terminal UE1 dispatches to the network entity NE a request for temporary subscription for the secondary terminal UE2. The dispatching of the request for temporary subscription is secure; to this end it uses the radio-pathway encryption established during the phase of attachment to the network of the main terminal UE1 in the course of step E0. The request for temporary subscription comprises the identifier IDsec of the secondary terminal UE2 obtained in the course of the previous step E2. In an exemplary embodiment, the request for temporary subscription also comprises a subscription duration intended to specify the duration of the temporary subscription of the secondary terminal UE2. In another exemplary embodiment, the absence of the duration of subscription in the request signifies that a default duration, provided for by the network NE, is defined.

The request for temporary subscription is received by the network entity NE in a reception step E4.

In a following step E5 of generating a temporary identifier and a temporary key, the network entity NE generates a temporary identifier IMSIsec and a temporary secret key Ksec for the secondary terminal UE2. This secret temporary key Ksec is specific to the secondary terminal. The temporary identifier IMSIsec is generated in accordance with an algorithm specific to the operator that provided the subscription to the user of the main terminal UE1. The temporary key Ksec is generated on the basis of the temporary identifier IMSIsec of the secondary terminal UE2 and of the session master key Kasme generated during the step of attaching to the network of the main terminal UE1. It is assumed that a key derivation algorithm KDF is used to this effect. Thus, Ksec=KDF(Kasme, IMSIsec).

In a following step E6 of generating a secondary session master key, the network entity NE generates a secondary session master key, denoted Kasmesec, for the secondary terminal UE2. The secondary session master key Kasmesec is generated on the basis of the temporary key Ksec, of the identifier IDsec of the secondary terminal UE2 received from the main terminal UE1 in the course of step E4, and of an identifier $ID_{NE}$ of the network for access to the network NE. The network entity NE uses to this effect a keys derivation algorithm denoted KDF'. Thus, Kasmesec=KDF' (Ksec, IDsec, $ID_{NE}$). Note that there is no new authentication of the main terminal UE1 with the network for this generation; it is the session master key Kasme of the main terminal UE1, generated for its current access to the network, which is used to generate the temporary key Ksec and therefore also the secondary session master key Kasmesec of the secondary terminal UE2.

In a following step E7 of creating a security context, the network entity NE creates a security context for the secondary terminal UE2. The security context comprises security data which are associated with the secondary terminal UE2. In particular, the security context comprises the secondary session master key Kasmesec of the secondary terminal UE2 as well as the set of keys that are necessary for secure communication between the secondary terminal UE2 and the network; these keys are derived on the basis of the secondary session master key Kasmesec of the secondary terminal UE2. In an EPS network, a security context is created during the authentication of a terminal by the network and is shared by the user equipment and the network. Here, the security context of the secondary terminal UE2 is created at the network level, for the secondary terminal UE2 after successful authentication of the main terminal UE1. Thus, the creation of the security context for the secondary terminal UE2 takes place in accordance with procedures which are proven in a secure environment constituted by the network. Moreover, the creation of the security context does not involve any exchanges of messages between the secondary terminal UE2 and the network entity NE; there is therefore no additional load for the network. Note that at this juncture, the secondary terminal UE2 does not yet have this security context at its disposal.

In a following dispatching step E8, the network entity NE dispatches in a secure manner to the main terminal UE1 the temporary identifier IMSIsec of the secondary terminal UE2 generated by the network entity NE in the course of step E5. The temporary identifier IMSIsec is received by the main terminal UE1 in a reception step E9. This dispatching takes place in a secure manner More precisely, securing relies upon the radio-pathway encryption established during the phase of attachment to the network of the main terminal UE1 in the course of step E0.

In a generating step E10, the main terminal UE1 generates the temporary key Ksec of the secondary terminal UE2 on the basis of the temporary identifier IMSIsec of the secondary terminal UE2 and of its own session master key Kasme, generated in the course of step E0 of attaching to the network. Accordingly, the main terminal UE1 uses the same keys diversification algorithm KDF as that used by the network entity NE in the course of step E5. Thus, Ksec=KDF(Kasme, IMSIsec).

In a dispatching step E11, the main terminal UE1 dispatches to the secondary terminal UE2 the temporary key Ksec that it generated in the course of the previous step, the identifier $ID_{NE}$ of the network for access to the network represented by the entity NE and the temporary identifier IMSIsec of the secondary terminal UE2 that it received from the network NE in the course of step E9. The identifier of the network $ID_{NE}$ is intended to allow the secondary terminal UE2 to identify the network that it will use to access the network NE. The temporary identifier IMSIsec of the secondary terminal is intended to be provided by the secondary terminal UE2 during its access to the network; this temporary identifier has been generated for the current session, it can be used by the network entity NE for the purposes for example of billing in conjunction with the subscription specific to the main terminal UE1. The dispatching of the temporary key Ksec, of the identifier of the network $ID_{NE}$ and of the temporary identifier IMSIsec of the secondary terminal UE2 is carried out on a near-field communication channel, for example by NFC (for "Near Field Communication"), or by BLE (for "Bluetooth Low Energy"). If the temporary key Ksec is compromised during this step, the security of the method is nevertheless not called into question. Indeed, the knowledge of the temporary key Ksec of the secondary terminal UE2 does not suffice in order to generate the profile for access to the network of the secondary terminal UE2, it is also necessary to know the identifier IDsec of the secondary terminal UE2, presumed private. Moreover, the temporary key Ksec is valid only for a current session, thereby limiting the possible effects of a compromise. The secondary terminal UE2 receives the temporary key Ksec, the identifier of the network $ID_{NE}$ and the temporary identifier IMSIsec in a reception step E12. More precisely, the reception of these data indicates to the secondary terminal its authentication with the access network identified and the authentication of the access network with the secondary terminal.

On conclusion of reception step E12, the secondary terminal UE2 has at its disposal a profile for access to the network which comprises the temporary identifier IMSIsec of the secondary terminal UE2, the temporary key Ksec and the identifier $ID_{NE}$ of the network NE. The profile is stored by the secondary terminal UE2.

In a following generating step E13, the secondary terminal UE2 generates the secondary session master key Kasmesec by means of its identifier IDsec, of the temporary key Ksec received from the main terminal UE1 and of the identifier $ID_{NE}$ of the access network. The secondary terminal UE2 uses the same keys diversification algorithm KDF' as that used by the network in the course of step E6.

In a following step E14 of generating a security context, the secondary terminal UE2 generates the hierarchy of keys necessary for access and for secure exchanges with the network in the same manner as the network generated this security context in the course of the security context creating step E7. To this end it uses the secondary session master key Kasmesec of the secondary terminal UE2. On conclusion of this step, the network NE and the secondary terminal UE2 share the knowledge of the set of keys and security data necessary for secure communication between the secondary terminal UE2 and the network NE.

In a following phase E15, not detailed, of accessing the network, the secondary terminal UE2 is able to access the network NE in a secure manner by means of the profile for access to the network and of the security context that were generated previously. Note that contrary to conventional access to a network, for example to an EPS network, there is no phase of authentication between the secondary terminal UE2 and the network NE in order to generate the profile for access to the network and the security context, since they have already been generated by the network entity NE and by the secondary terminal UE2 via the main terminal UE1. It is therefore considered that, on account of the implementation of the steps described previously and which have led to the generation of a profile and of a security context, the network entity NE and the secondary terminal UE2 are already mutually authenticated. However, at this juncture, the attachment of the secondary terminal UE2 still requires physical attachment to the network, that is to say at radio level. This physical attachment is represented by step E15.

In an exemplary embodiment, where a duration of the temporary subscription is specified in the temporary subscription request dispatched by the main terminal UE1 in the course of step E3, the network NE supervises this duration. Thus, access to the network from the secondary terminal UE2 can be interrupted, on the initiative of the network NE, once the duration of the subscription has elapsed.

The method for obtaining a profile for access to a network such as described above, allows the secondary terminal UE2 and the network entity NE to generate an access profile which allows the secondary terminal UE2 to access the network in a secure manner without messages being exchanged directly between the network and the secondary terminal UE2, as is the case in conventional procedures for accessing a network. The generation of the access profile takes place under cover of the main terminal UE1 which triggers this generation by dispatching an explicit request to the network entity NE for temporary subscription for the secondary terminal UE2 and which is an intermediary between the network entity NE and the secondary terminal UE2 for the obtaining of the access profile. The data customarily necessary for generating such a profile, in this instance an authentication key and a subscription identifier, which are customarily stored in a security element, are here generated in the network for a current session.

The method does not make it necessary to have established a secure link between the main terminal UE1 and the secondary terminal UE2. Nevertheless, the method is secure since it relies upon an already existing security context between the main terminal UE1 and the network NE. Moreover, operations which are tricky from a security point of view are implemented in the network, in this instance the generating of the temporary key Ksec of the secondary terminal UE2. Generating and using the temporary key Ksec for the current session contribute to the securing of the method in the sense that, if the temporary key Ksec is compromised, it is nevertheless not possible to use it to access the network. Indeed, knowledge solely of the temporary key Ksec does not suffice to generate the secondary session master key Kasmesec of the secondary terminal UE2 and the hierarchy of keys which is used to access the network. The identifier IDsec of the secondary terminal UE2 is necessary in order to generate the secondary session master key Kasmesec of the secondary terminal UE2 and this identifier is not transmitted in the network.

The method described here allows a user terminal, in this instance the secondary terminal UE2, to access the network without an authentication phase such as EPS AKA (for "Authentication Key Agreement") being implemented. This decreases the network load.

With the method described, it is the network which, by having the responsibility for generating keys and a security context for the secondary terminal UE2, protects access to its network.

The method makes it possible moreover to combat the cloning of authentication data, or credentials, since the keys which allow the secondary terminal UE2 to access the network are generated by and in the network, for a current session. They are therefore not long-lasting.

The profile for access to the network which has been generated by way of the main terminal UE1 does not involve any dependency from a connection point of view, of the secondary terminal UE2 in relation to the main terminal UE1. Indeed, once the access profile has been generated and shared between the secondary terminal UE2 and the network NE, access of the secondary terminal to the network can take place independently of the main terminal UE1. Thus, there is no necessity, for the secondary terminal UE2, to be in geographical proximity to the main terminal UE1. Neither is there any necessity for the main terminal UE1 to be switched on and/or charged, contrary to the constraints induced by access to the network based on the use of the main terminal UE1 as a modem (the English term "tethering" is customarily used).

The method for obtaining a profile for access to a network such as described above allows a network operator to offer its clients, on demand, secure and immediate network access for devices which do not possess any security module and associated data. For example, it is possible to request a profile for access to the network for an "IoT" (from the English "Internet of Things") device, of connected object type, which is not equipped with a security module. The latter then accesses the network, to transmit measurement data via the Internet network without the terminal which made the initial request for temporary subscription being present. The measured data can be health data: a user obtains a profile for his connected watch which transmits in tandem with the user's physical measurements during a sports trial. The measured data can relate to a home-automation network, etc.

In the exemplary embodiment and the cases of usage described hereinabove, the secondary terminal UE2 does not possess any security element. The invention is not limited to this case and in another exemplary embodiment, the secondary terminal UE2 comprises a security element which comprises authentication data which are not adapted to access the mobile network NE. In this case, the main terminal can request a temporary subscription for the secondary terminal UE2 in order for the latter to access the network NE.

In another exemplary embodiment, the secondary terminal UE2 possesses a security element and a valid subscription but this subscription is limited; for example it does not allow the user to access the data network. In this case, a user of the main terminal UE1 can request the generation of a profile for access to the network for a secondary terminal so as to offer the latter more extensive temporary network access than that at his disposal initially. This case of usage corresponds for example to a parent who requests the generation of a profile for access to the data network for the mobile terminal of their child, which initially is not configured to access the data network.

The method for obtaining a profile for access to the network is illustrated here within the framework of a network of EPS type. The invention is however not limited to this type of network and also applies to other types of mobile networks, such as for example the "GPRS" (from the English "General Packet Radio Service"), or "UMTS" (from the English "Universal Mobile Telecommunications System") network, or networks currently under definition, such as the 5G network.

Figure 2:
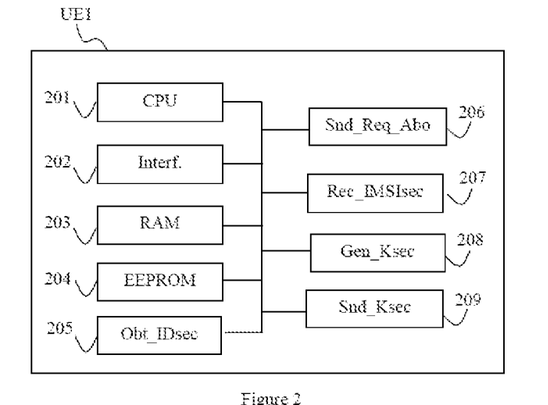
FIG. 2 is a schematic representation of a main terminal, able to implement the steps of the method for obtaining a profile for access to the network, according to an exemplary embodiment.

A main terminal UE1 according to an exemplary embodiment, will now be described in conjunction with FIG. 2.

A main terminal UE1 is a user equipment which customarily comprises an execution environment for user applications and an execution environment in charge of network communications, or "baseband", as well as a security element. The security element is designed to store and process sensitive data, such as cryptographic keys and algorithms. Such data and algorithms are intended to be used during a phase of attachment of the main terminal UE1 to a communication network NE, and in particular in the course of the authentication procedure between the main terminal UE1 and the network NE. The interactions between the execution environments and the security module being very tight during access of the main terminal UE1 to the network NE and for readability reasons, no distinction is made hereinafter between the security element and these execution environments which are thus grouped together in the main terminal UE1.

The invention is not limited to a user equipment of this type and in another exemplary embodiment, the security element of the main terminal UE1 is in the form of a secure software area designed to process the network-access sensitive data.

In the example described here, the main terminal UE1 comprises:
- a processing unit 201, or CPU, designed to execute code instructions;
- a radio interface 202, designed to interface with the mobile communication network;
- a set of memories, which include a volatile memory 203 of RAM type, used to execute code instructions, to store variables, etc., and a storage memory 204 of flash or EEPROM memory type. The storage memory 204 is designed to store data and applications. In particular, the storage memory 204 stores a software module for aiding the obtaining of a profile for access to the network for a secondary terminal UE2 (not represented in FIG. 2) designed to implement those of the steps of the method for obtaining a profile for access to a network described above which are implemented by the main terminal UE1. The storage memory 204 also stores an authentication key, customarily denoted K, an identifier $ID_{NE}$ of the network for access to the network NE which it is accessing, and customarily called "nominal network", and an identifier of the main terminal UE1, for example a permanent identifier of IMSI type. The authentication key K is shared with the network NE and is used to generate, at the level of the network and at the level of the main terminal UE1, at least one session master key, denoted Kasme, specific to the main terminal UE1 and intended to be used for generating a hierarchy of keys to establish a secure communication between the network and the main terminal UE1. Of course, it is understood that the area of the storage memory 204 which comprises the authentication key K, the identifier $ID_{NE}$ of the network for access to the network and the identifier IMSI of the main terminal UE1 lies in the security element.

The main terminal UE1 also comprises:
- a module 205 for obtaining an identifier, designed to obtain an identifier IDsec of the secondary terminal UE2. In an exemplary embodiment, the module 205 for obtaining an identifier is a QR code reader. In another exemplary embodiment, corresponding to the case of manual inputting of the identifier of the secondary terminal UE2, the obtaining module 205 comprises a keypad and an input module. The module 205 for obtaining an identifier of the secondary terminal UE2 is designed to implement step E2 of obtaining an identifier of the method for obtaining a profile for access to a network such as described above;
- a module 206 for dispatching a request for temporary subscription, designed to dispatch to the network NE a request for temporary subscription for the secondary terminal UE2, said request comprising the identifier IDsec of the secondary terminal. The dispatching module 206 is designed to implement step E3 of the method for obtaining a profile for access to a network such as described above;
- a reception module 207, designed to receive, from the network, a temporary identifier IMSIsec of the secondary terminal UE2, said identifier being generated by the network. The reception module 207 is designed to implement step E9 of the method for obtaining a profile for access to a network such as described above;
- a generating module 208, designed to generate a temporary key Ksec specific to the secondary terminal UE2. The temporary key Ksec is generated on the basis of the session master key Kasme of the main terminal and of the temporary identifier IMSIsec of the secondary terminal UE2 received from the network. The generating module 208 is designed to implement step E10 of the method for obtaining a profile for access to a network such as described above;
- a dispatching module 209, designed to dispatch to the secondary terminal UE2 the temporary key Ksec and the identifier $ID_{NE}$ of the network for access to the network NE. The dispatching module 209 is designed to implement step E11 of the method for obtaining a profile for access to a network such as described above.

The modules 205 of an identifier of the secondary terminal UE2, 206 for dispatching a request for temporary subscription, 207 for reception, 208 for generation and 209 for dispatching are preferably software modules comprising software instructions for implementing the steps of the method for obtaining a profile for access to the communication network for a secondary terminal via the terminal which are executed by the main terminal UE1.

The invention therefore also relates to:
- a computer program comprising instructions for the implementation of the method for obtaining a profile for access to the communication network such as described above when this program is executed by a processor of the main terminal UE1, and
- a readable recording medium on which the above-described computer program is recorded.

Figure 3:
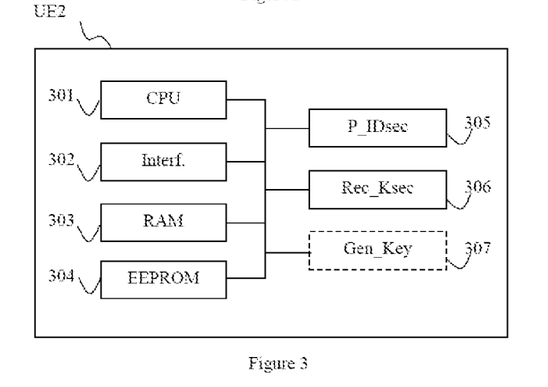
FIG. 3 is a schematic representation of a secondary terminal, able to implement the steps of the method for obtaining a profile for access to the network, according to an exemplary embodiment.

A secondary terminal UE2, according to an exemplary embodiment, will now be described in conjunction with FIG. 3.

A secondary terminal UE2 is a user equipment which customarily comprises an execution environment for user applications and radio capabilities in the form of an execution environment in charge of network communications, or "baseband". In an exemplary embodiment, the secondary terminal UE2 does not possess any security element and security data associated allowing it to access the network NE. In another exemplary embodiment, the secondary terminal UE2 possesses a security element. However, in this case, the security data that this module comprises do not allow access to the network comparable to access implemented by virtue of the profile for access to the network obtained via the main terminal UE1.

In the example described here, the secondary terminal UE2 comprises:
- a processing unit 301, or CPU, designed to execute code instructions;
- a radio interface 302, designed to interface with the mobile communication network;
- a set of memories, which include a volatile memory 303 of RAM type, used to execute code instructions, to store variables, etc., and a storage memory 304 of flash or EEPROM memory type. The storage memory 304 is designed to store data and applications. In particular, the storage memory 304 stores a software module for obtaining a profile for access to the network via the main terminal UE1 (not represented in FIG. 3) designed to implement those of the steps of the method for obtaining a profile for access to a network described above which are implemented by the secondary terminal UE2. The storage memory 304 also stores an identifier IDsec of the secondary terminal UE2.

The secondary terminal UE2 also comprises:
- a module 305 for providing an identifier IDsec of the secondary terminal UE2 to the main terminal UE1. In an exemplary embodiment, the providing module 305 is an application for generating identifiers, or tickets. The identifier generated is for example in the form of a string of alphanumeric characters. In another exemplary embodiment, the providing module 305 is a reading area, which figures on the secondary terminal UE2 and which comprises the identifier stored in the secondary terminal UE2. The module 305 for providing an identifier is designed to implement step E2 of the method for obtaining a profile for access to a communication network, such as described above;
- a reception module 306, designed to receive, from the main terminal UE1, a temporary key Ksec, a temporary identifier IMSIsec of the secondary terminal UE2 and an identifier $ID_{NE}$ of the network for access to the network NE. The temporary key Ksec is generated on the basis of the temporary identifier IMSIsec of the secondary terminal, generated by the network and of a session master key Kasme specific to the main terminal UE1. The session master key Kasme is generated on the one hand by the network and on the other hand by the main terminal UE1 on the basis of the authentication key K shared between the network and the main terminal UE1, and stored in the security module of the main terminal UE1. The temporary key Ksec, the temporary identifier IMSIsec, the identifier IDsec of the secondary terminal and the identifier $ID_{NE}$ of the network for access to the network are included in the profile for access to the network of the secondary terminal UE2. The reception module 306 is designed to implement step E12 of the method for obtaining a profile for access to a communication network, such as described above;
- a generating module 307, designed to generate a secondary session master key Kasmesec, specific to the secondary terminal UE2, on the basis of the temporary key Ksec, of the identifier IDsec of the secondary terminal, and of the identifier $ID_{NE}$ of the access network. Note that the generating module 307 is optional for the obtaining of a profile for access to the network. It appears dashed in FIG. 3. It is however essential for access to the network by the secondary terminal UE2. The generating module 307 is designed to implement step E13 of the method for obtaining a profile for access to a communication network, such as described above.

The modules 305 for providing an identifier of the secondary terminal, 306 for reception and 307 for generation are preferably software modules comprising software instructions for implementing the steps of the method for obtaining a profile for access to the communication network for a secondary terminal via a main terminal which are executed by the secondary terminal UE2.

The invention therefore also relates to:
- a computer program comprising instructions for the implementation of the method for obtaining a profile for access to the communication network such as described above when this program is executed by a processor of the secondary terminal UE1, and
- a readable recording medium on which the above-described computer program is recorded.

Figure 4:
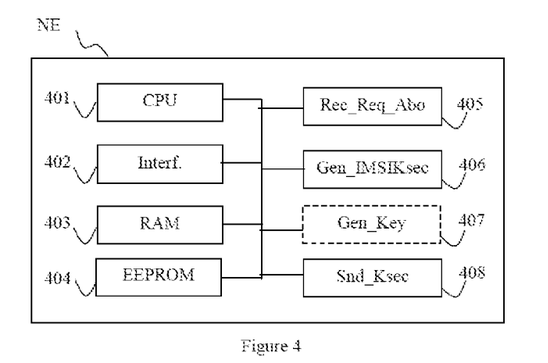
FIG. 4 is a schematic representation of a network entity able to implement the steps of the method for obtaining a profile for access to the network, according to an exemplary embodiment.

A network entity NE, according to an exemplary embodiment, will now be described in conjunction with FIG. 4.

The network entity NE is for example a server of the network. It comprises:
- a processing unit 401, or CPU, designed to execute code instructions;
- a radio interface 402, designed to interface with mobile terminals;
- a set of memories, which include a volatile memory 403 of RAM type, used to execute code instructions, to store variables, etc., and a storage memory 404 of flash or EEPROM memory type. The storage memory 404 is designed to store data and applications. In particular, the storage memory 404 stores a software module for obtaining a profile for access to a communication network represented by the network entity NE for a secondary terminal UE2 via a main terminal UE1 (which are not represented in FIG. 4). The software module is designed to implement those of the steps of the method for obtaining a profile for access to a network described above which are implemented by the network entity NE.

The network entity NE also comprises:
- a reception module 405, designed to receive from the main terminal UE1, a request for temporary subscription for the secondary terminal UE2, said request comprising an identifier IDsec of the secondary terminal UE2. In an exemplary embodiment, the request for temporary subscription comprises a duration of the subscription. The reception module 405 is designed to implement step E4 of receiving a request for temporary subscription of the method for obtaining a profile for access to the network such as described above;
- a module 406 for generating a temporary identifier and a temporary key, designed to generate a temporary identifier IMSIsec and a temporary key Ksec of the secondary terminal UE2, said temporary key being generated on the basis of the temporary identifier of the secondary terminal and of the session master key Kasme of the main terminal. The session master key Kasme is generated on the one hand by the network and on the other hand by the main terminal UE1 on the basis of the authentication key K shared between the network and the main terminal UE1, and stored in the security module of the main terminal UE1. The temporary key Ksec, the temporary identifier IMSIsec, the identifier IDsec of the secondary terminal, and an identifier $ID_{NE}$ of the network for access to the network are included in a profile for access to the network of the secondary terminal UE2. The generating module 406 is designed to implement step E5 of generating of the method for obtaining a profile for access to the network such as described above;

a module 407 for generating a secondary session master key, designed to generate a secondary session master key Kasmesec on the basis of the temporary key Ksec and of the identifier IDsec of the secondary terminal, the secondary session master key, the temporary identifier of the secondary terminal and the identifier $ID_{NE}$ of the network for access to the network NE being included in a profile for access to the network of the secondary terminal. The module 407 for generating a secondary session master key is optional for obtaining a profile for access to the network. It appears dashed in the figure. It is however essential for access to the network. The module 407 for generating a secondary session master key is designed to implement step E6 of generating of the method for obtaining a profile for access to the network such as described above;

a dispatching module 408, designed to dispatch the temporary identifier of the secondary terminal to the main terminal. The dispatching module 408 is designed to implement step E8 of dispatching of the method for obtaining a profile for access to the network such as described above.

The modules 405 for reception, 406 for generating a temporary identifier and a temporary key, 407 for generating a secondary session master key and 408 for dispatching the temporary identifier of the secondary terminal are preferably software modules comprising software instructions for implementing the steps of the method for obtaining a profile for access to the communication network for a secondary terminal via a main terminal which are executed by the network entity NE.

The invention therefore also relates to:
a computer program comprising instructions for the implementation of the method for obtaining a profile for access to the communication network such as described above when this program is executed by a processor of the network entity NE, and
a readable recording medium on which the above-described computer program is recorded.

The invention also relates to a system for obtaining a profile for access to a communication network. This system comprises at least one main terminal UE1, a secondary terminal UE2 and a network entity NE such as are described above. Such a system is designed to implement the steps of the method for obtaining a profile for access to the network such as described above.

Although the present disclosure has been described with reference to one or more examples, workers skilled in the art will recognize that changes may be made in form and detail without departing from the scope of the disclosure and/or the appended claims.

The invention claimed is:

1. A method for obtaining a profile for access to a communication network by a secondary user terminal via a main user terminal, the main user terminal comprising a security element for accessing said communication network, said security element comprising an authentication key, said authentication key being used by the communication network and by the main user terminal to generate at least one session master key specific to the main user terminal, the method, implemented by the secondary user terminal, comprising:
   providing to the main user terminal an identifier of the secondary user terminal,
   receiving on a near-field communication channel from the main user terminal data comprising a temporary key specific to the secondary user terminal, a temporary identifier of the secondary user terminal, and an identifier of an access network for access to the communication network, which form the profile for access to the communication network of the secondary user terminal,
   said temporary key being generated on the basis of the temporary identifier of the secondary user terminal generated by the communication network and of the session master key of the main user terminal,
   the secondary user terminal storing the profile for access to the communication network, the profile including the temporary key, the temporary identifier, the identifier of the secondary user terminal and the identifier of the access network, and
   the reception of the profile indicating to the secondary user terminal its authentication with the access network identified and the authentication of said access network with the secondary user terminal.

2. The method as claimed in claim 1, comprising:
   the secondary user terminal generating a secondary session master key specific to the secondary user terminal on the basis of the temporary key and of the identifier of the secondary user terminal.

3. A method for aiding an obtaining of a profile for access to a communication network by a secondary user terminal via a main user terminal, the main user terminal comprising a security module for accessing said communication network, said security element comprising an authentication key, said authentication key being used by the network and by the main user terminal to generate at least one session master key specific to the main user terminal, the method, implemented by the main user terminal, comprising:
   obtaining an identifier of the secondary user terminal,
   dispatching to the communication network a request for temporary subscription for the secondary user terminal, said request comprising the identifier of the secondary user terminal,
   receiving, from the communication network, a temporary identifier of the secondary user terminal generated by the communication network,
   generating a temporary key specific to the secondary user terminal, on the basis of the session master key of the main user terminal and of the temporary identifier of the secondary user terminal, and
   dispatching on a near-field communication channel to the secondary user terminal the temporary key and the temporary identifier of the secondary user terminal, and an identifier of an access network for access to the communication network which form the profile for access to the communication network of the secondary user terminal.

4. The method as claimed in claim 3, in which the request for temporary subscription for the secondary user terminal comprises a duration of the subscription.

5. A method for generating a profile for access to a communication network for a secondary user terminal via a main user terminal, the main user terminal comprising a security module for accessing said communication network, said security element comprising an authentication key, said authentication key being used by the communication network and by the main user terminal to generate at least one session master key specific to the main user terminal, the method implemented by the communication network comprising:
- receiving, from the main user terminal, a request for temporary subscription for the secondary user terminal, said request comprising an identifier of the secondary user terminal,
- generating a temporary identifier and a temporary key specific to the secondary user terminal, said temporary key being generated on the basis of the temporary identifier of the secondary user terminal and of the session master key of the main user terminal, the temporary key, the temporary identifier and the identifier of the secondary user terminal, and an identifier of an access network for access to the communication network forming the profile for access to the communication network of the secondary user terminal,
- dispatching to the main user terminal the temporary identifier of the secondary user terminal.

6. The method as claimed in claim 5, comprising:
- generating a secondary session master key specific to the secondary user terminal on the basis of the temporary key and the identifier of the secondary user terminal.

7. A secondary user terminal designed to obtain a profile for access to a communication network via a main user terminal, the main user terminal comprising a security element for accessing said communication network, said security element comprising an authentication key, said authentication key being used by the communication network and by the main user terminal to generate at least one session master key specific to the main user terminal, the secondary user terminal comprising:
- a processor; and
- a non-transitory computer-readable medium comprising instructions stored thereon which when executed by the processor configure the secondary user terminal to perform acts comprising:
- providing an identifier of the secondary user terminal to the main user terminal,
- receiving on a near-field communication channel from the main user terminal data comprising a temporary key specific to the secondary user terminal, a temporary identifier of the secondary user terminal, and an identifier of an access network for access to the communication network, which form the profile for access to the communication network of the secondary user terminal, said temporary key being generated on the basis of the temporary identifier of the secondary user terminal generated by the communication network and of the session master key of the main user terminal,
- storing the profile for access to the communication network, the profile including the temporary key, the temporary identifier, the identifier of the secondary user terminal and the identifier of the access network, the reception of the profile indicating to the secondary user terminal its authentication with the access network identified and the authentication of said access network with the secondary user terminal.

8. The secondary user terminal as claimed in claim 7, wherein the instructions further configure the secondary user terminal to generate a secondary session master key specific to the secondary user terminal on the basis of the temporary key and of the identifier of the secondary user terminal.

9. A non-transitory computer-readable medium comprising instructions stored thereon, which when executed by a secondary user terminal configure the secondary user terminal to obtain a profile for access to a communication network by the secondary user terminal via a main user terminal, the main user terminal comprising a security element for accessing said communication network, said security element comprising an authentication key, said authentication key being used by the communication network and by the main user terminal to generate at least one session master key specific to the main user terminal, where the obtaining by the secondary user terminal comprises:
- providing to the main user terminal an identifier of the secondary user terminal,
- receiving on a near-field communication channel from the main user terminal data comprising a temporary key specific to the secondary user terminal, a temporary identifier of the secondary user terminal, and an identifier of an access network for access to the communication network, which form the profile for access to the communication network of the secondary user terminal,
- said temporary key being generated on the basis of the temporary identifier of the secondary user terminal generated by the communication network and of the session master key of the main user terminal,
- storing the profile for access to the communication network, the profile including the temporary key, the temporary identifier, the identifier of the secondary user terminal and the identifier of the access network,
- the reception of the profile indicating to the secondary user terminal its authentication with the access network identified and the authentication of said access network with the secondary user terminal.

10. A main user terminal designed to aid the obtaining of a profile for access to a communication network by a secondary user terminal, the main user terminal comprising a security module for accessing said communication network, said security element comprising an authentication key, said authentication key being used by the communication network and by the main user terminal to generate at least one session master key specific to the main user terminal, the main user terminal comprising:
- a processor; and
- a non-transitory computer-readable medium comprising instructions stored thereon which when executed by the processor configure the main user terminal to perform acts comprising:
- obtaining an identifier of the secondary user terminal,
- dispatching to the communication network a request for temporary subscription for the secondary user terminal, said request comprising the identifier of the secondary user terminal,
- receiving from the communication network a temporary identifier of the secondary user terminal generated by the communication network,
- generating a temporary key specific to the secondary user terminal, said temporary key being generated on the basis of the session master key of the main user terminal and of the temporary identifier of the secondary user terminal,
- dispatching on a near-field communication channel to the secondary user terminal the temporary key, the temporary identifier and an identifier of an access network for access to the communication network which form the profile for access to the communication network of the secondary user terminal.

11. A non-transitory computer-readable medium comprising instructions stored thereon, which when executed by a main user terminal configure the main user terminal to aid the obtaining of a profile for access to a communication network by a secondary user terminal via a main user terminal, the main user terminal comprising a security module for accessing said communication network, said security element comprising an authentication key, said authentication key being used by the network and by the main user terminal to generate at least one session master key specific to the main user terminal, the aiding by the main user terminal comprising:

obtaining an identifier of the secondary user terminal, dispatching to the communication network a request for temporary subscription for the secondary user terminal, said request comprising the identifier of the secondary user terminal,     receiving, from the communication network, a temporary identifier of the secondary user terminal generated by the communication network,     generating a temporary key specific to the secondary user terminal, on the basis of the session master key of the main user terminal and of the temporary identifier of the secondary user terminal, and     dispatching t on a near-field communication channel o the secondary user terminal the temporary key and the temporary identifier of the secondary user terminal, and an identifier of an access network for access to the communication network which form the profile for access to the communication network of the secondary user terminal.

12. A device of a communication network, designed to generate a profile for access to a communication network for a secondary user terminal via a main user terminal, the main user terminal comprising a security module for accessing said communication network, said security element comprising an authentication key, said authentication key being used by the communication network and by the main user terminal to generate at least one session master key specific to the main user terminal, the device comprising:

a processor; and a non-transitory computer-readable medium comprising instructions stored thereon which when executed by the processor configure the device to perform acts comprising:

receiving, from the main user terminal, a request for temporary subscription for the secondary user terminal, said request comprising an identifier of the secondary user terminal,     generating a temporary identifier and a temporary key specific to the secondary user terminal, said temporary key being generated on the basis of the temporary identifier of the secondary user terminal and of the session master key of the main user terminal, the temporary key, the temporary identifier, the identifier of the secondary user terminal and an identifier of an access network for access to the communication network forming the profile for access to the communication network of the secondary user terminal,     dispatching the temporary identifier of the secondary user terminal to the main user terminal.

13. The device as claimed in claim 12, wherein the instructions further configure the device to generate a secondary session master key specific to the secondary user terminal on the basis of the temporary key and of the identifier of the secondary user terminal, the secondary session master key, the temporary identifier of the secondary user terminal and an identifier of an access network being included in a profile for access to the communication network of the secondary user terminal.

14. A non-transitory computer-readable medium comprising instructions stored thereon, which when executed by a device of a communication network configure the device to generate a profile for access to the communication network for a secondary user terminal via a main user terminal, the main user terminal comprising a security module for accessing said communication network, said security element comprising an authentication key, said authentication key being used by the communication network and by the main user terminal to generate at least one session master key specific to the main user terminal, the generating of the profile by the device comprising:

receiving, from the main user terminal, a request for temporary subscription for the secondary user terminal, said request comprising an identifier of the secondary user terminal,     generating a temporary identifier and a temporary key specific to the secondary user terminal, said temporary key being generated on the basis of the temporary identifier of the secondary user terminal and of the session master key of the main user terminal, the temporary key, the temporary identifier and the identifier of the secondary user terminal, and an identifier of an access network for access to the communication network forming the profile for access to the communication network of the secondary user terminal,     dispatching to the main user terminal of the temporary identifier of the secondary user terminal.

* * * * *